US008984152B1

(12) United States Patent
Van Elburg (10) Patent No.: US 8,984,152 B1
(45) Date of Patent: Mar. 17, 2015

(54) MESSAGE HANDLING IN AN IP MULTIMEDIA SUBSYSTEM

(71) Applicant: Telefonaktiebolaget L M Ericsson (publ), Stockholm (SE)

(72) Inventor: Johannes Van Elburg, Oosterhout (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/541,441

(22) Filed: Nov. 14, 2014

Related U.S. Application Data

(63) Continuation of application No. 14/286,516, filed on May 23, 2014, which is a continuation of application No. 12/812,266, filed as application No. PCT/EP2008/050305 on Jan. 11, 2008, now Pat. No. 8,762,553.

(51) Int. Cl.
*G06F 15/16* (2006.01)
*H04L 29/08* (2006.01)
*H04L 29/06* (2006.01)
*H04W 84/04* (2009.01)

(52) U.S. Cl.
CPC .............. *H04L 67/147* (2013.01); *H04L 69/22* (2013.01); *H04W 84/042* (2013.01)
USPC ............................. 709/229; 370/389; 370/310

(58) Field of Classification Search
USPC ......................................................... 709/229
See application file for complete search history.

(56) References Cited

U.S. PATENT DOCUMENTS

| 2004/0196796 | A1 | 10/2004 | Bajko |
| 2005/0009520 | A1 | 1/2005 | Herrero |
| 2009/0227236 | A1 | 9/2009 | Herrero |
| 2010/0111087 | A1 | 5/2010 | Lindgren |
| 2011/0113141 | A1 | 5/2011 | Veenstra |
| 2011/0164608 | A1 | 7/2011 | Lindgren |
| 2011/0299462 | A1 | 12/2011 | Imbimbo |
| 2012/0082158 | A1 | 4/2012 | Reddy |

FOREIGN PATENT DOCUMENTS

| WO | 2004086723 A1 | 10/2004 |
| WO | 2005055549 A1 | 6/2005 |
| WO | 2007060074 A1 | 5/2007 |

OTHER PUBLICATIONS

Larsen et al. Corporate Convergence with the 3GPP IP Multimedia Subsystem, NGMAST '07 Proceedings of the The 2007 International Conference on Next Generation Mobile Applications, Services and Technologies, Sep. 12, 2007, pp. 29-35, IEEE Computer Society Washington, DC, USA © 2007 ISBN: 0-7695-2878-3.

*Primary Examiner* — Hamza Algibhah
(74) *Attorney, Agent, or Firm* — Coats & Bennett, PLLC (57) ABSTRACT

A method and apparatus for handling a Session Initiation Protocol communication in an IP Multimedia Subsystem (IMS) network. A Proxy Call Session Control Function receives a Session Initiation Protocol message sent from a trusted remote network. The P-CSCF adds to the message a further header, which identifies a Public User Identity of a trusted entity located in the remote network served by a Serving Call Session Control Function in the IMS network. The message is then sent to the S-CSCF. The S-CSCF, and any other node that the message is sent to, knows from the presence of the further header to use the Public User Identity of the trusted entity to determine the served user rather than the P-Asserted Identity contained in the SIP message.

16 Claims, 4 Drawing Sheets

MESSAGE HANDLING IN AN IP MULTIMEDIA SUBSYSTEM

CROSS-REFERENCE TO RELATED APPLICATIONS

This application is a continuation application of U.S. application Ser. No. 14/286,516 filed on May 23, 2014, which in turn, is a continuation application of U.S. application Ser. No. 12/812,266 filed on Aug. 2, 2010, which is the National Stage of International Application No. PCT/EP2008/050305, filed Jan. 11, 2008, the disclosures of each of which are incorporated herein by reference in their entirety.

TECHNICAL FIELD

The present invention relates to Session Initiation Protocol message handling in a communications network.

BACKGROUND

IP Multimedia Subsystem (IMS) is the technology defined by the Third Generation Partnership Project (3GPP) to provide IP Multimedia services over mobile communication networks (3GPP TS 22.228). IMS provides key features to enrich the end-user person-to-person communication experience through the integration and interaction of services. IMS allows new rich person-to-person (client-to-client) as well as person-to-content (client-to-server) communications over an IP-based network.

The IMS makes use of the Session Initiation Protocol (SIP) to set up and control calls or sessions between user terminals (UEs) or between UEs and application servers (ASs). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Within an IMS network, Call/Session Control Functions (CSCFs) operate as SIP entities within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

IMS service functionality is implemented using application servers (ASs). For any given UE, one or more ASs may be associated with that terminal. ASs communicate with an S-CSCF via the IMS Service Control (ISC) interface and are linked into a SIP messaging route as required (e.g. as a result of the triggering of iFCs downloaded into the S-CSCF for a given UE).

A user registers in the IMS using the specified SIP REGISTER method. This is a mechanism for attaching to the IMS and announcing to the IMS the address giving the location at which a SIP user identity can be reached. In 3GPP, when a SIP terminal performs a registration, the IMS authenticates the user using subscription information stored in a Home Subscriber Server (HSS), and allocates an S-CSCF to that user from the set of available S-CSCFs. Whilst the criteria for allocating S-CSCFs are not specified by 3GPP, these may include load sharing and service requirements. It is noted that the allocation of an S-CSCF is key to controlling, and charging for, user access to IMS-based services. Operators may provide a mechanism for preventing direct user-to-user SIP sessions that would otherwise bypass the S-CSCF.

During the registration process, it is the responsibility of the I-CSCF to select an S-CSCF, if an S-CSCF is not already selected. The I-CSCF receives the required S-CSCF capabilities from the HSS, and selects an appropriate S-CSCF based on the received capabilities. It is noted that S-CSCF allocation is also carried for a user by the I-CSCF in the case where the user is called by another party, and the user is not currently allocated an S-CSCF. When a registered user subsequently sends a session request to the IMS, the P-CSCF is able to forward the request to the selected S-CSCF based on information received from the S-CSCF during the registration process.

Every IMS user possesses one or more Private User Identities. A Private User Identity is assigned by the home network operator and is used by the IMS, for example for registration, authorization, administration, and accounting purposes. This identity takes the form of a Network Access Identifier (NAI) as defined in IETF RFC 2486. It is possible for a representation of the International Mobile Subscriber Identity (IMSI) to be contained within the NAI for the private identity. 3GPP TS 23.228 specifies the following properties of the Private User Identity:

- The Private User Identity is not used for routing of SIP messages.
- The Private User Identity is contained in all Registration requests, (including Re-registration and De-registration requests) passed from the UE to the home network.
- An IP multimedia Services Identity Module (ISIM) application securely stores one Private User Identity. It is not possible for the UE to modify the Private User Identity information stored on the ISIM application.
- The Private User Identity is a unique global identity defined by the Home Network Operator, which may be used within the home network to identify the user's subscription (e.g. IM service capability) from a network perspective. The Private User Identity identifies the subscription, not the user.
- The Private User Identity is permanently allocated to a user's subscription (it is not a dynamic identity), and is valid for the duration of the user's subscription with the home network.
- The Private User Identity is used to identify the user's information (for example authentication information) stored within the HSS (for use for example during Registration).
- The Private User Identity may be present in charging records based on operator policies.
- The Private User Identity is authenticated only during registration of the user, (including re-registration and de-registration).
- The S-CSCF needs to obtain and store the Private User Identity upon registration and unregistered termination.

In addition to a Private User Identity, every IMS user has one or more IMS Public User Identities (PUIs). The PUIs are used by any user to request communications to other users. A user might for example include a PUI (but not a Private User Identity) on a business card. 3GPP TS 23.228 specifies the following properties of the PUI:

- Both telecom numbering and Internet naming schemes can be used to address users depending on the PUIs that the users have.
- The PUI(s) take the form of a SIP URI (as defined in RFC 3261 and RFC 2396 or the "tel:"-URI format defined in RFC 3966.

An ISIM application securely stores at least one PUI (it shall not be possible for the UE to modify the PUI), but it is not required that all additional PUIs be stored on the ISIM application.

A PUI is registered either explicitly or implicitly before the identity can be used to originate IMS sessions and IMS session unrelated procedures.

A PUI is registered either explicitly or implicitly before terminating IMS sessions and terminating IMS session unrelated procedures can be delivered to the UE of the user that the PUI belongs to.

It is possible to register globally (i.e. through one single UE request) a user that has more than one PUI via a mechanism within the IMS (e.g. by using an Implicit Registration Set). This does not preclude the user from registering individually some of his/her PUIs if needed.

PUIs are not authenticated by the network during registration.

PUIs may be used to identify the users information within the HSS (for example during mobile terminated session set-up).

PUIs may be used by ASs within the IMS to identify service configuration data to be applied to a user.

Figure 1:
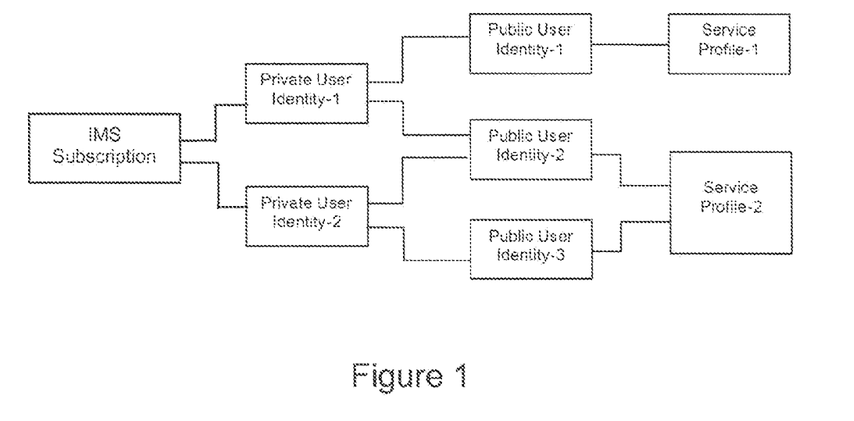
FIG. 1 illustrates schematically example relationships between a user IMS subscription and Public and Private User Identities.

FIG. 1 illustrates schematically example relationships between a user (IMS) subscription and the Public and Private User Identities. In the example shown, a subscriber has two Private User Identities, with both being associated with two Public User Identities (one of the Public User Identities, Public User Identities-2, being associated with both Private User Identities). A Service Profile is associated with each Public User Identity, this profile specifying service data for the associated Public User Identities. A Service Profile is created or modified when an application server is provisioned for a user at the Home Subscriber Server. Each Service Profile comprises one or more initial Filter Criteria (iFCs), which are used to trigger the provision, or restriction, of IMS services. The differences between services offered by Service Profile-1 and Service Profile-2 are operator specific, but may involve different application servers (ASs), and even different charging/rating schemes.

In the example shown in FIG. 1, Public User Identity-1 is associated with a Service Profile-1, whilst Public User Identity-2 and Public User Identity-3 are associated with Service Profile-2. In a typical scenario, the Public User Identity-1 might be an identity that the user gives to friends and family, e.g. "Big_Joe@priv.operator.com", whilst Public User Identity-2 and Public User Identity-3 might be identities that the user gives to business contacts, e.g. "+46111222333@operator.com" and "joe.black@operator.com".

3GPP defines a so-called "Implicit Registration Set" concept to identify a set of PUIs that work as a group, and which are registered and deregistered together when any one of the PUIs of the set is registered or deregistered. 3GPP requires that the HSS sends the Implicit Registration Set to the S-CSCF upon registration of a user or upon terminating a call. It has been understood that, at registration, the HSS identifies all PUIs within the Implicit Registration Set, and then identifies all of the Service Profiles associated with these PUIs. The Service Profiles (or selected data from the Service Profiles) containing the PUIs with which they are associated are then sent to the S-CSCF. As a result of this operation, the S-CSCF knows all of the PUIs that belong to the same Implicit Registration Set, as well as their Service Profiles.

A possible use case of the IMS involves a collection of users having a group level subscription to the IMS, but where the individual users themselves have no subscription and of which the IMS is unaware. It is desirable to allow direct inward and outward dialing to the users. This might arise, for example, in the case of a company having a subscription to the IMS and having individual employee stations or terminals attached to an IP private branch exchange (IP-PBX). The employee terminals may or may not be provided with SIP clients. In the latter case, the IP-PBX performs a translation between SIP and non-SIP signalling. Whilst it might of course be possible for the IMS to record an individual PUI for each terminal (within the same Implicit Registration Set), this becomes inefficient as the group size becomes large. ETSI TISPAN defines such a corporate network as a Next Generation Corporate Network (NGCN).

It is possible to include within the Implicit Registration Set associated with a subscription, a wildcarded Public User Identity. "Wildcarded" or "wildcard" is understood here to mean a Public User Identity that contains a symbol or symbol that stands for one or more unspecified characters. The wildcarded Public User Identity has a service profile associated with it. Any node within the IP Multimedia Subsystem which performs checks or processing based upon the Implicit Registration Set, acts upon a received Public User Identity matching a wildcarded Public User Identity in the same way as if the received Public User Identity matched any standard Public User Identity within the Implicit Registration Set. Rather than representing a range of Public User Identities using a wildcarded Public User Identity, such a range may instead be represented by a sub-domain. For example, a range of Tel URIs may be represented by a dialing prefix, whilst a range of SIP URIs may be represented by a corporate domain. This allows routing to and from corporate network users when the corporate network is connected to an IMS network over the Gm reference point.

However, there is a requirement in the TISPAN published specification for Business Communication Requirements (ETSI TS 181 019 (V2.0.0): Telecommunications and Internet converged Services and Protocols for Advanced Networking (TISPAN); Business Communication Requirements)] that expresses that the operator's trust domain should be able to be extended into the corporate network domain where a business trunk between an IMS network and a trusted corporate network is in place. An implication of this is that the P-CSCF in the IMS network must accept a P-Asserted-Identity header sent from the corporate network over the Gm reference point. The P-Asserted-Identity header is a header in a SIP message that contains a SIP URI and an optional display-name. The P-Asserted-Identity is an identity that is used among trusted SIP entities, typically intermediaries, to carry the identity of the user sending a SIP message as it was verified by authentication. The P-Asserted-Identity is inserted into the header field of a SIP message by a SIP entity once the node has authenticated the originating user in some way. A consequence of this is that the P-Asserted-Identity may not represent the originating served user of the IMS network, as the P-Asserted-Identity contains an identity that is authenticated by the remote/corporate/private network.

The S-CSCF normally uses the P-Asserted-Identity to check whether any relevant restrictions have been placed on the originating UE, e.g. is the UE barred from using the requested service. The S-CSCF also uses the P-Asserted-Identity and call case to determine the Initial Filter Criteria (IFCs) for the UE. Assuming, for example, that the IFCs require that the S-CSCF forward the INVITE to a particular AS, the S-CSCF includes at the topmost level of the SIP route header the URI of the AS. It also includes in the subsequent level its own URI, together with an Original Dialog Identifier (ODI). The ODI is generated by the S-CSCF and uniquely identifies the call to the S-CSCF. The AS will itself perform authentication based upon the P-Asserted-Identity contained in the message. It can be concluded from this that the P-Asserted-Identity is used in an originating IMS network to determine the served user, for the network to be able to execute the right policies/services for this user.

As described above, when the trust domain is extended from a public IMS network into another network connected over a Gm reference point, the P-Asserted-Identity can contain a user identity not known in the IMS network. However, a problem arises because the P-Asserted-Identity is also used by originating IMS core systems to determine the served user. When forwarding a message containing a P-Asserted-Identity of a user that does not represent the user currently served by a P-CSCF, and in some cases a P-Asserted-Identity that is not the identity of a known IMS user, the current procedures would either fail, procedures would be executed for the wrong user, or the P-CSCF would drop the P-Asserted-Identity belonging to a different user.

SUMMARY

The inventor has devised a method to allow an IMS network to extend its trust domain to another network. A P-CSCF in the IMS network, after receiving a SIP message from the trusted company domain, inserts a new header, termed a P-Served-User header, in the SIP message before sending the SIP message to an S-CSCF. Optionally the P-CSCF only inserts the new header when the P-Asserted-Identity in the SIP message does not match an identity of an Implicit Registration set belonging to the trusted entity. The P-Served-User header includes the identity of the served user. The identity of the served user is a default identity belonging to the trusted network site through which the SIP message entered the IMS network. An S-CSCF that subsequently receives the SIP message is then aware that it must use the P-Served-User header field to determine the served user and it can ignore a P-Asserted-Identity header field for the purpose of determining the served user.

According to a first aspect of the invention, there is provided a method of handling a Session Initiation Protocol (SIP) communication within an IP Multimedia Subsystem (IMS) network. A Proxy Call Session Control Function (P-CSCF) receives a SIP message sent from a remote network. The P-CSCF adds to the message a further header, which identifies a Public User Identity of a trusted entity in the remote network served by a Serving Call Session Control Function in the IMS network. Optionally the P-CSCF only inserts the new header when the P-Asserted-Identity in the SIP message does not match the identity of the trusted entity. The Public User Identity of the trusted entity is optionally obtained by determining the identity of a secure channel on which message was received. The message is then sent to the S-CSCF. The S-CSCF, and any other node that the message is sent to, knows from the presence of the further header to ignore the contents of a P-Asserted-Identity header, which may not include the identity of the user Public User Identity served by the S-CSCF, and instead to use the Public User Identity of the trusted entity contained in the further header.

The SIP message is optionally sent via a business trunk between the remote network and the IMS network, and the remote network is trusted by the IMS network. Because the IMS network's P-CSCF trusts the remote network (this can be termed being in the same trustdomain, see IETF RFC 3324 and RFC 3325) it will trust the P-Asserted-Identity received from that network, and nodes within the IMS network which trust the P-CSCF will trust the P-Asserted-Identity received from it and so on. This is termed transitive trust. Nodes in the IMS network will therefore be aware that the trusted entity can be trusted.

Optionally, the further header identifying the private network node is obtained from subscription information relating to the Public User Identity of the trusted entity stored at either a Home Subscriber Server or, in the case of a NGN network, a User Profile Server Function located in the IP Multimedia Subsystem network.

The subscription information relating to the Public User Identity of the trusted entity optionally includes an Implicit Registration Set. Optionally an Implicit Registration Set includes a wildcarded Public User Identity or Public User Identity sub-domain representative of a range of Public User Identities. As a further option, the SIP message is a SIP INVITE message sent from the trusted entity on behalf of a user of the remote network.

According to a second aspect of the invention, there is provided a P-CSCF node for use in an IMS network. The P-CSCF Function node comprises a receiver for receiving a SIP message sent from a remote network. A processor is provided for adding to the message a further header, the further header identifying a Public User Identity of a trusted entity in the remote network that is served by a S-CSCF. The P-CSCF also includes a transmitter for sending the message to the S-CSCF. The further header can be used by other nodes in the IMS network to inform them to use information in the further header to identify the served node, rather than information contained in the P-Asserted-Identity header.

The P-CSCF optionally comprises means for receiving subscription information relating to the Public User Identity of the trusted entity from one of a Home Subscriber Server and a User Profile Server Function located in the IMS network.

The subscription information optionally includes an Implicit Registration Set, the Implicit Registration Set comprising a wildcarded Public User Identity or Public User Identity sub-domain representative of a range of Public User Identities.

According to a third aspect of the invention, there is provided a S-CSCF node for use in an IMS network. The S-CSCF node comprises a receiver for receiving a Session Initiation Protocol message from a P-CSCF node, and a processor for identifying the presence of a further header in the Session Initiation Protocol message, the further header identifying a Public User Identity of a trusted entity in a remote network served by the Serving Call Session Control Function. The S-CSCF also includes means for, in the event that the further header is identified, using the Public User Identity of the trusted entity in that header to determine the served user instead of the P-Asserted-Identity header contained in the SIP message. In this way, messages received by the S-CSCF in which the served user is not identified by the P-Asserted-Identity header can be dealt with properly.

According to a fourth aspect of the invention, there is provided an Application Server (AS) for use in an IMS network. The AS comprises a receiver for receiving a SIP message, and a processor for identifying the presence of a further header in the Session Initiation Protocol message. The further header identifies a Public User Identity of a trusted entity in a remote network served by a S-CSCF in the IMS network. The AS further includes means for, in the event that the further header is identified, using the Public User Identity of the trusted entity contained in that header to determine the served user instead of the P-Asserted-Identity.

DETAILED DESCRIPTION

Figure 2:
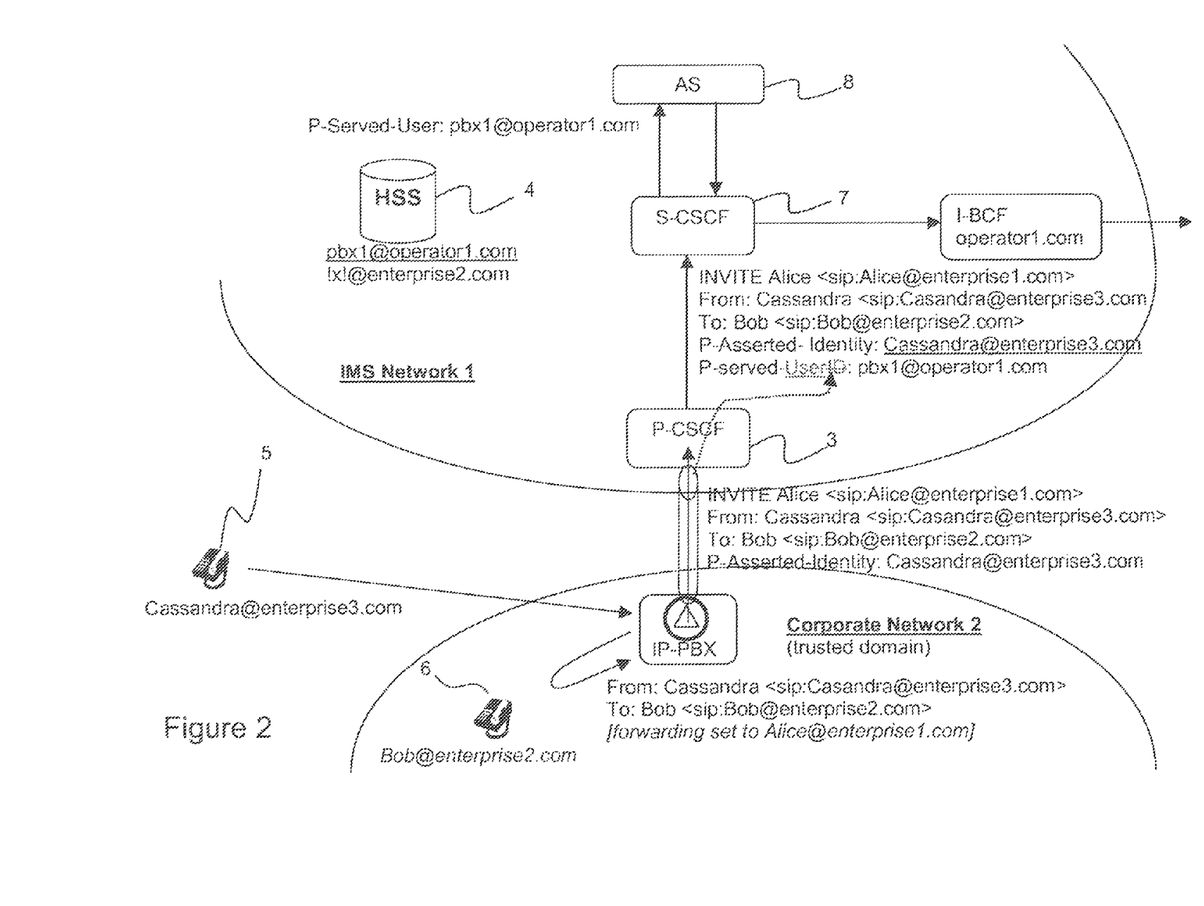
FIG. 2 illustrates schematically in a block diagram a signalling flow between a corporate network and an IMS network according to an embodiment of the invention.

Referring to FIG. 2, there is illustrated schematically an IMS network 1 and a trusted corporate network 2. The corporate network 2 contains a Private Branch Exchange (PBX), denoted IP-PBX. The IP-PBX registers with the IMS network 1 on behalf of a group of user terminals. IP-PBX learns the address of the outbound P-CSCF 3 located in the IMS network 1 by way of a DHCP lookup (as specified in IETF RFC 3263). IP-PBX registers with the IMS network using its own PUI (in this example, "pbx1@operator.com"). An HSS 4 in the IMS network 1 stores subscription information for IP-PBX, which includes an Implicit Registration Set that includes all users able to access the IMS network 1 via IP-PBX. In addition to IP-PBX's PUI and a tel URI allocated to IP-PBX, the Implicit Registration Set contains a "wildcard" PUI which represents a range of PUIs associated with the PBX. In this example, the wildcard PUI is "!x!@enterprise2.com". The "!x!" component of the wildcard PUI indicates that a PUI having the specified suffix and any prefix will match the wildcard PUI.

The HSS 4 sends the Implicit Registration Set to an S-CSCF 7 in a Server Assignment Answer together with the associated service profile(s). The S-CSCF 7 then sends a 200 OK message to IP-PBX via the I-CSCF (not shown) and the P-CSCF 3, with the 200 OK message including a P-Associated-URI field identifying the PUIs within the Implicit Registration Set associated with the PUI of the PBX.

Considering the case where a terminal in the trusted corporate network wishes to forward a call to another terminal, a first terminal 5 having the identity Cassandra@enterprise3.com calls a second terminal 6 having the identity Bob@enterprise2.com. A message sent from the first terminal 5 contains in its header the URI Cassandra@enterprise3.com in the "From" field and Bob@enterprise2.com in the "To" field. The message also includes the P-Asserted-Identity of Cassandra@enterprise3.com. However, messages sent to Bob@enterprise2.com are to be forwarded to Alice@enterprise1.com.

The message is returned to IP-PBX for forwarding to Alice@enterprise1.com, and IP-PBX determines that this must be sent to the P-CSCF 3 in the IMS network 1. IP-PBX sends an INVITE message to the P-CSCF 3, the invite message containing the URI for Alice, the URI for Cassandra in the "From" field, and the URI for Bob in the "To" field. The INVITE also contains Cassandra's P-Asserted-Identity.

Note that a trust relationship exists between the IP-PBX in the corporate network 2 and the IMS network 1. Because the P-CSCF 3 receives the SIP INVITE on the security association that was created during registration, the P-CSCF is aware that the INVITE is to be treated on behalf of pbx1@operator1.com. The P-CSCF 3 is also aware that the trust domain of the IMS network 1 extends to IP-PBX in the corporate network 2. The P-CSCF 3 passes the P-Asserted-Identity unmodified and inserts a new header to the INVITE, the new header referred to as the "P-Served-User". The P-Served-User header contains the URI of IP-PBX, that is pbx1@operator1.com. Note that in one embodiment, the P-CSCF 3 will only insert a P-Served-User header in the event that the P-Asserted-Identity does not match the identity from which the message was received. In this example, the P-CSCF will only insert a P-Served-User header if the P-Asserted-Identity is not an element of the Implicit Registration Set belonging to the trusted entity.

The P-CSCF 3 forwards the SIP INVITE containing the P-Served-User header to the S-CSCF 7. The iFCs associated with pbx1@operator.com subscription may indicate that the INVITE is to be processed by a call forwarding Application Server (AS) 8. In this case, the S-CSCF 7 performs standard operations of adding the SIP URI of the AS 8 as the topmost URI of the route header, and including its own SIP URI beneath the AS URI in the route header together with the "original dialog identifier" (ODI). The message is then forwarded to the AS 8 over the ISC interface. The S-CSCF 7 maintains state information for the session to which the INVITE relates. This information includes the ODI and the identity of the served User.

The S-CSCF 7 also determines the served user based upon the P-Served-User, rather than the P-Asserted-Identity. This allows authentication to be based on the IP-PBX identity associated with IP-PBX, rather than the P-Asserted-Identity contained in the SIP INVITE.

If the P-Served-User header were not included in the SIP INVITE, nodes in the IMS network would attempt to perform authorization on the P-Asserted-Identity (in this case, Cassandra@enterprise3.com). As Cassandra@enterprise3.com does not belong to the IMS network or the attached corporate network, authentication using the P-Asserted-Identity would fail.

The invention allows the P-CSCF 3 to communicate the served user (Bob@enterprise2.com) in a separate information element in the SIP INVITE from the identity of the network asserted originating user (Cassandra@enterprise3.com). The S-CSCF 7 uses this to determine the served user. This allows corporate networks to be treated as trusted networks.

Figure 3:
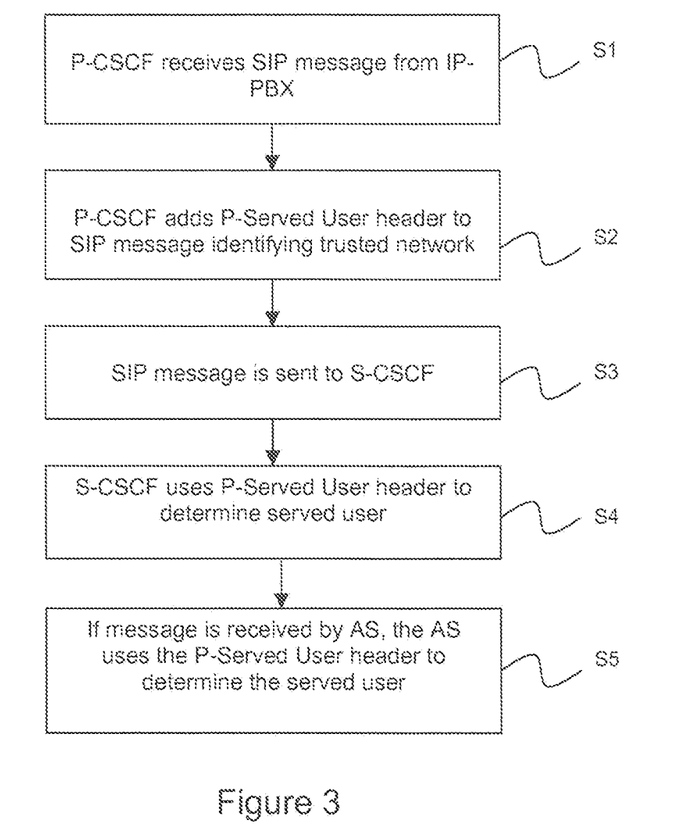
FIG. 3 is a flow diagram showing the basic steps of an embodiment of the invention.

FIG. 3 is a flow diagram illustrating the basic steps of an embodiment of the invention. The following numbering refers to the numbering in FIG. 3:

S1. The P-CSCF receives a SIP message from IP-PBX on the security association created during registration;

S2. By receiving the SIP message on the existing security association and recognising this is coming from a trusted entity, and determining that the P-Asserted-Identity does not belong to the set of implicitly registered identities, the P-CSCF adds the URL of IP-PBX to the SIP message in the form of a P-Served-User header and leaves an optionally existing P-Asserted-Identity header intact, as the IP-PBX has a subscription with the IMS network and the network asserted originating user may not have such a subscription;

S3. The SIP message resulting from step 2 is sent to the S-CSCF;

S4. The S-CSCF, being aware of the presence of the P-Served-User header, ignores the P-Asserted-Identity and uses the P-Served-User header to determine the served user for processing of its procedures. If iFCs are activated for the served user, the SIP message may be forwarded to an AS;

S5. If the message is subsequently received by an AS, the AS, being aware of the presence of the P-Served-User header, uses the P-Served-User header to determine the served user for processing relevant procedures.

Figure 4:
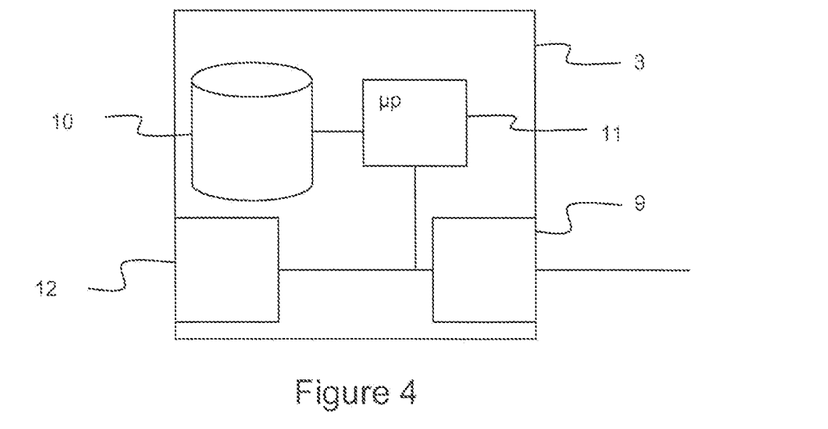
FIG. 4 illustrates schematically in a block diagram a P-CSCF according to an embodiment of the invention.

FIG. 4 illustrates schematically a P-CSCF 3 according to an embodiment of the invention. The P-CSCF 3 comprises a receiver 9 for receiving from IP-PBX a SIP message. A memory 10 is provided for storing subscription information relating to IP-PBX, and a processor 11 is provided for adding a P-Served-User header to the SIP message, the P-Served-User header identifying the subscription relating to IP-PBX. A transmitter 12 is also provided for sending the SIP message to a further node such as an S-CSCF.

Figure 5:
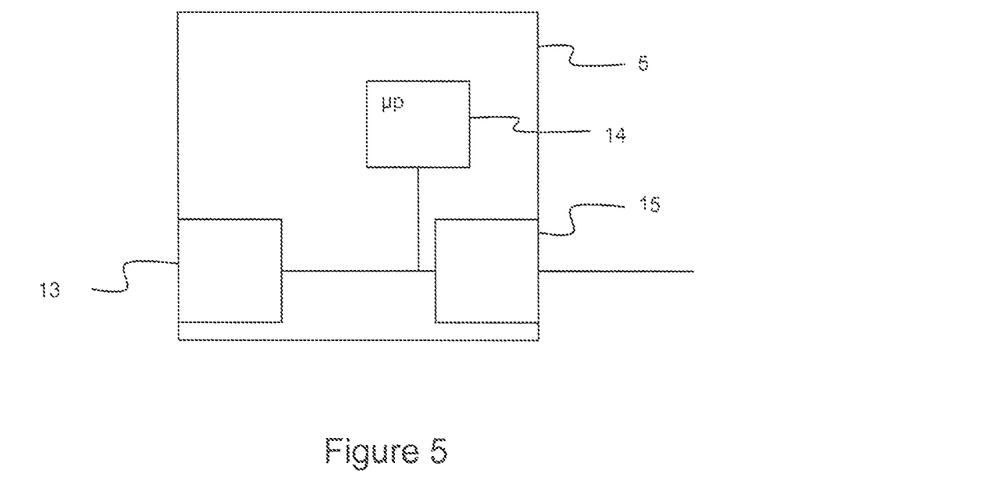
FIG. 5 illustrates schematically in a block diagram an S-CSCF according to an embodiment of the invention.

FIG. 5 illustrates schematically a S-CSCF 5 according to an embodiment of the invention. The S-CSCF 7 comprises a receiver 13 for receiving a SIP message from the P-CSCF 3, and a processor 14 for determining if the SIP message contains a P-Served-User header. If a P-Served-User header is present in the SIP message, then the P-Served-User header will be used to determine the served user instead of the P-Asserted-Identity. A transmitter 15 is also provided for sending the message to other nodes in the IMS network for further processing.

Figure 6:
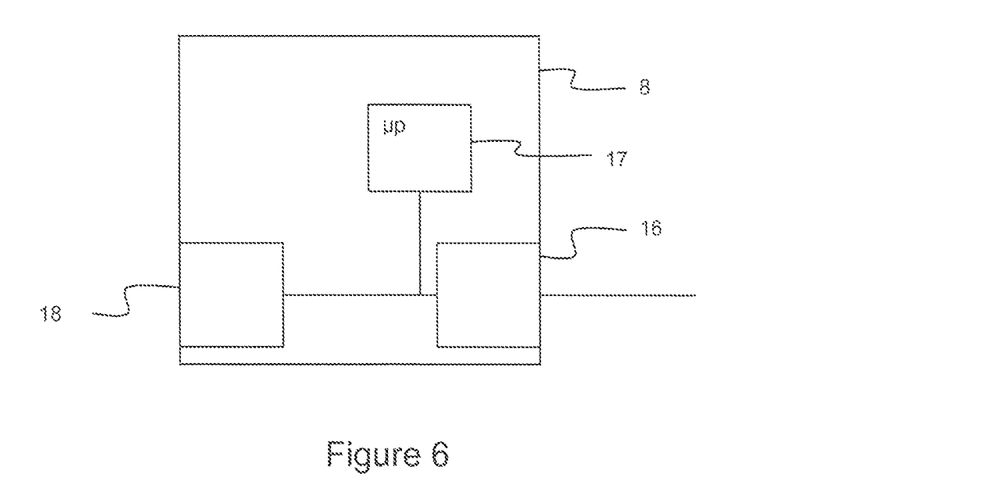
FIG. 6 illustrates schematically in a block diagram an Application Server according to an embodiment of the invention.

FIG. 6 illustrates schematically an AS 8 according to an embodiment of the invention. The AS 8 comprises a receiver 16 for receiving a SIP message, and a processor 17 for determining if the SIP message contains a P-Served-User header. If a P-Served-User header is present in the SIP message, then the P-Served-User header will be used to determine the served user instead of the P-Asserted-Identity header. The AS also has a transmitter 18 for sending messages to other nodes in the IMS network.

It will be appreciated by the person of skill in the art that various modifications may be made to the embodiments described above without departing from the scope of the present invention. For example, the above description refers to an IP_PBX node in a corporate network. However, the invention also applies to a connected SIP proxy node or SIP B2BUA disposed in corporate networks or other types of network.

The invention claimed is:

1. A method for handling a Session Initiation Protocol (SIP) message within an IP Multimedia Subsystem (IMS) network at a Proxy Call Session Control Function (P-CSCF), the method comprising:
    receiving a SIP message for an initial request for a dialog from a remote network, wherein the SIP message originates at a first entity communicatively connected to a trusted entity located in the remote network and comprises a first header field;
    determining whether the SIP message was received from the trusted entity;
    if the SIP message was received from the trusted entity:
        maintaining a P-Asserted-Identity header in the first header field unchanged; and
        adding a served user of the initial request for a dialog in a P-Served-User header field; and
    sending the SIP message to the S-CSCF.

2. The method of claim 1 wherein the P-Served-User header field identifies a Public User Identity (PUI) of the trusted entity served by a Serving Call Session Control Function (S-CSCF) of the IMS network.

3. The method of claim 2 further comprising obtaining the PUI of the trusted entity based on determining an identity of a secure channel on which the SIP message was received.

4. The method of claim 2 further comprising obtaining the served user of the initial request for a dialog from subscription information associated with the PUI of the trusted entity, wherein the subscription information is stored at one of a Home Subscriber Server (HSS) and a User Profile Server Function (UPSF) located in the IMS network.

5. The method of claim 4 wherein the subscription information comprises an Implicit Registration Set (IRS) that includes at least one of a wildcard PUI, and a PUI sub-domain representative of a range of PUIs.

6. The method of claim 1 wherein the SIP message is received from the trusted entity over a business trunk.

7. The method of claim 1 wherein the identity of the first entity is asserted by the trusted entity.

8. The method of claim 1 wherein adding a served user of the initial request for a dialog to the SIP message comprises adding the served user of the initial request for a dialog if the P-Asserted-Identity in the SIP message does not match an identity of an IRS associated with the trusted entity.

9. The method of claim 1 wherein adding a served user of the initial request for a dialog to the SIP message comprises adding the served user of the initial request for a dialog if the P-Asserted-Identity in the SIP message does not match the identity of the trusted entity.

10. The method of claim 1 wherein adding a served user of the initial request for a dialog to the SIP message comprises adding the served user of the initial request for a dialog if the P-Asserted-Identity in the SIP message does not match the identity of an entity from which the message was received.

11. A Proxy Call Session Control Function (P-CSCF) node in an IP Multimedia Subsystem (IMS) network, the P-CSCF node comprising:
    a receiver configured to receive a SIP message for an initial request for a dialog from a remote network, wherein the SIP message comprises a first header field and originates at a first entity communicatively connected to a trusted entity located in the remote network;
    a processor circuit configured to:
        determine whether the SIP message was received from the trusted entity; and
        if the SIP message was received from the trusted entity:
            maintain a P-Asserted-Identity header in the first header field unchanged; and
            add a served user of the initial request for a dialog in a P-Served-User header field; and
    a transmitter configured to send the SIP message to the S-CSCF.

12. The P-CSCF node of claim 11 wherein the P-Served-User header identifies a Public User Identity (PUI) of the trusted entity served by a Serving Call Session Control Function (S-CSCF) of the IMS network.

13. The P-CSCF node of claim 12 wherein the processor circuit is further configured to obtain the served user of the initial request for a dialog from subscription information associated with the PUI of the trusted entity, and wherein the subscription information is stored at one of a Home Subscriber Server (HSS) and a User Profile Server Function (UPSF) located in the IMS network.

14. The P-CSCF node of claim 13 wherein the subscription information comprises an Implicit Registration Set (IRS) that includes at least one of a wildcard PUI, and a PUI sub-domain representative of a range of PUIs.

15. A method for handling a Session Initiation Protocol (SIP) message within an IP Multimedia Subsystem (IMS) network at a Proxy Call Session Control Function (P-CSCF), the method comprising:

receiving a SIP message for an initial request for a dialog from a trusted terminal located in a remote network, wherein the SIP message originated at a first terminal communicatively connected to the trusted terminal and comprises a first header field;

maintaining a P-Asserted-Identity header in the first header field unchanged;

adding a served user of the initial request for a dialog in a P-Served-User header field; and sending the SIP message to the S-CSCF.

16. The method of claim 15 wherein the P-Served-User header identifies a Public User Identity (PUI) of the trusted entity served by a Serving Call Session Control Function (S-CSCF) of the IMS network.

* * * * *

UNITED STATES PATENT AND TRADEMARK OFFICE
CERTIFICATE OF CORRECTION

Page 1 of 2

PATENT NO. : 8,984,152 B1
APPLICATION NO. : 14/541441
DATED : March 17, 2015
INVENTOR(S) : Van Elburg It is certified that error appears in the above-identified patent and that said Letters Patent is hereby corrected as shown below:

Title page, item (56), under "OTHER PUBLICATIONS", in Column 2, Line 2, delete "the The" and insert -- the --, therefor.

In the Drawings

Delete drawing sheet 2 of 4, and replace with drawing sheet 2. (attached)

In the Specification

In Column 1, Line 12, delete "2008," and insert -- 2008, now Patent No. 8,762,553, --, therefor.

In Column 2, Line 65, delete "(as" and insert -- as --, therefor.

In Column 3, Line 19, delete "users" and insert -- user's --, therefor.

In Column 4, Line 37, delete "Requirements)]" and insert -- Requirements) --, therefor.

In Column 9, Line 16, delete "S-CSCF 5" and insert -- S-CSCF 7 --, therefor.

Signed and Sealed this
Eleventh Day of August, 2015

Michelle K. Lee
*Director of the United States Patent and Trademark Office*

Figure 2